(12) United States Patent
Al-Aqeeli et al.

(10) Patent No.: US 9,296,913 B2
(45) Date of Patent: *Mar. 29, 2016

(54) RECYCLED CRUMB RUBBER COATING

(71) Applicant: KING FAHD UNIVERSITY OF PETROLEUM AND MINERALS, Dhahran (SA)

(72) Inventors: Nasser Al-Aqeeli, Dhahran (SA); Hamoud M. Assehdi Al-Hajri, Al-Khobar (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,311

(22) Filed: Jul. 7, 2014

(65) Prior Publication Data

US 2014/0316031 A1    Oct. 23, 2014

Related U.S. Application Data

(63) Continuation-in-part of application No. 13/532,533, filed on Jun. 25, 2012, now Pat. No. 8,853,303.

(51) Int. Cl.
| | |
|---|---|
| C08L 63/00 | (2006.01) |
| C09D 163/00 | (2006.01) |
| C09D 117/00 | (2006.01) |
| C08G 59/50 | (2006.01) |
| C09D 119/00 | (2006.01) |

(52) U.S. Cl.
CPC .......... *C09D 117/00* (2013.01); *C08G 59/5006* (2013.01); *C09D 119/003* (2013.01); *C09D 163/00* (2013.01)

(58) Field of Classification Search
CPC .............................. C09D 163/00; C08L 63/00
USPC ........................................... 525/187; 523/456
See application file for complete search history.

(56) References Cited

U.S. PATENT DOCUMENTS

| | | | |
|---|---|---|---|
| 3,894,686 A * | 7/1975 | Weinberg et al. ................. 238/8 |
| 5,106,554 A | 4/1992 | Drews | |
| 5,258,222 A * | 11/1993 | Crivelli ......................... 428/323 |
| 5,397,825 A | 3/1995 | Segrest | |
| 5,883,182 A * | 3/1999 | Hunt ............................. 524/525 |
| 5,969,053 A | 10/1999 | Bauman et al. | |
| 6,374,753 B1 | 4/2002 | Radke, Jr. | |
| 6,833,396 B2 | 12/2004 | Radke, Jr. | |
| 6,896,964 B2 | 5/2005 | Kvesic | |
| 7,393,583 B1 * | 7/2008 | Warren ......................... 428/327 |
| 2002/0149129 A1 * | 10/2002 | Radke, Jr. ..................... 264/122 |
| 2007/0101907 A1 | 5/2007 | Hellmann | |
| 2009/0326104 A1 | 12/2009 | Malboeuf et al. | |
| 2010/0009152 A1 * | 1/2010 | Lau et al. ...................... 428/220 |
| 2010/0204404 A1 | 8/2010 | Hongo | |
| 2011/0031757 A1 * | 2/2011 | Mitsuoka et al. ............... 290/55 |

FOREIGN PATENT DOCUMENTS

| | | |
|---|---|---|
| WO | WO 2006/107190 A1 | 10/2006 |
| WO | WO 2007/025389 A1 | 3/2007 |

OTHER PUBLICATIONS

Mathew et al., "Epoxy resin/liquid natural rubber system: secondary phase separation and its impact on mechanical properties", *Journal of Materials Science*, vol. 45, No. 7, pp. 1769-1781, Jan. 20, 2010.

Sipahi-Saglam et al., "Studies on epoxy modified with recycled rubber", *Polymer Engineering & Science*, vol. 41, Issue 3, pp. 514-521, Mar. 2001.

* cited by examiner

*Primary Examiner* — Megan McCulley

(74) *Attorney, Agent, or Firm* — Richard C. Litman

(57) ABSTRACT

The recycled crumb rubber coating is a corrosion-proof coating for piping and the like. The coating is formed from recycled crumb rubber mixed with an epoxy resin and a hardener. Crumb rubber is first mixed with a liquid epoxy resin. An agent for reducing the viscosity of the liquid epoxy resin may also be added. A hardener is then added to this mixture. Finally, powdered crumb rubber is added and mixed to form the recycled crumb rubber coating. The total crumb rubber forms about 23-24 wt % of the coating, the balance being epoxy. The epoxy has liquid epoxy resin and a hardener in a ratio of about 2:1 by weight. The epoxy may also include a viscosity reducing agent of about 1% of the total weight of the liquid resin and the hardener. The crumb rubber may be a blend of powdered crumb rubber and mesh crumb rubber.

19 Claims, 1 Drawing Sheet

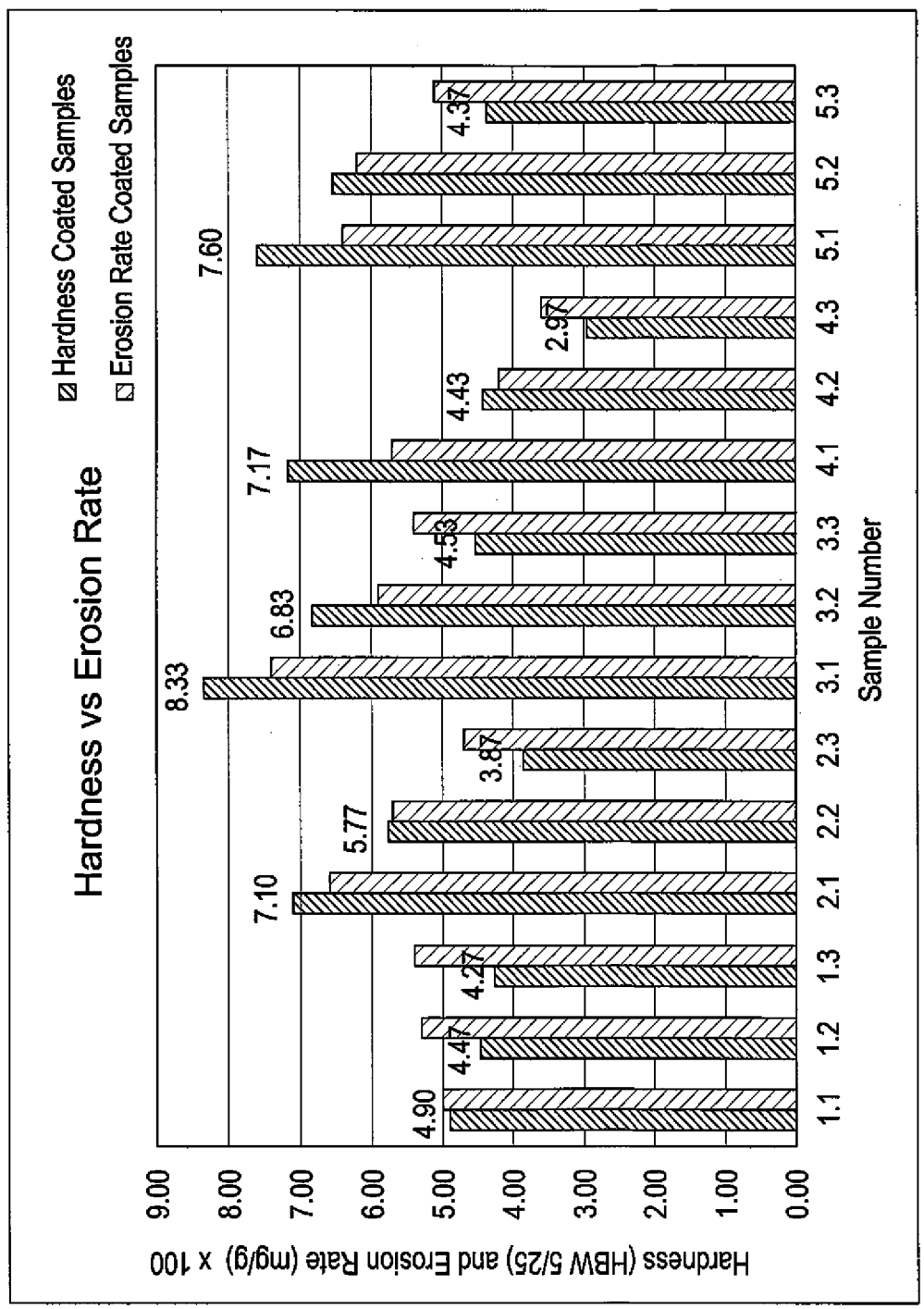

RECYCLED CRUMB RUBBER COATING

CROSS-REFERENCE TO RELATED APPLICATION

This application is a continuation-in-part of U.S. patent application Ser. No. 13/532,533, filed on Jun. 25, 2012.

BACKGROUND OF THE INVENTION

1. Field of the Invention

The present invention relates generally to corrosion-proof coatings for piping and the like, and particularly to a recycled crumb rubber coating formed from recycled crumb rubber mixed with an epoxy resin and a hardener.

2. Description of the Related Art

Crumb rubber is a type of rubber material, typically extracted from automotive and truck scrap tires. During the recycling process, steel and fluff is removed, leaving tire rubber with a granular consistency. Continued processing with a granulator and/or cracker mill, often with the aid of cryogenics or mechanical means, reduces the size of the particles further. The particles are sized and classified based on various criteria, such as color ("black only" or "black and white"). The granulate is sized by passing it through a screen. The size is based on the dimension of the screen or on its mesh. Although recycling of scrap tires is highly desirable, the uses of crumb rubber have, thus far, been fairly limited. Crumb rubber is primarily used in artificial turf as cushioning, where it is sometimes referred to as "astro-dirt". Given the large volume of scrap tires around the world, and the need to conserve natural resources, as well as reducing pollutants, it would be desirable to provide further recycling uses for crumb rubber.

Typical commercially available coating products for piping and the like are either relatively hard, such as conventional epoxies and polyurethanes, or relatively expensive and difficult to apply, such as polysulfide and polyurea. Further, even the flexible, modified epoxies and polyurethanes lose their flexibility quickly as time elapses. It would be desirable to provide a flexible industrial coating for the protection of steel and concrete structures exposed to water and industrial chemicals, and to further provide such a coating that could utilize recycled crumb rubber.

Thus, a recycled crumb rubber coating solving the aforementioned problems is desired.

SUMMARY OF THE INVENTION

The recycled crumb rubber coating is a corrosion-proof coating for piping and the like. The coating is formed from recycled crumb rubber mixed with an epoxy resin and a hardener. The crumb rubber is first mixed with a liquid epoxy resin. An agent for reducing the viscosity of the liquid epoxy resin, such as benzyl alcohol, may also be added. A hardener is then added to this mixture. Finally, powdered crumb rubber is added and mixed to form the recycled crumb rubber coating. The total crumb rubber forms about 23 wt % of the recycled crumb rubber coating. If no viscosity reducing agent is added, then the liquid epoxy resin forms about 51.6 wt % of the recycled crumb rubber coating. If the viscosity reducing agent is added, then the liquid epoxy resin forms about 50.1 wt % of the recycled crumb rubber coating, and the viscosity reducing agent forms about 1.5 wt % of the recycled crumb rubber coating. The hardener forms about 25.4 wt % of the recycled crumb rubber coating.

These and other features of the present invention will become readily apparent upon further review of the following specification.

BRIEF DESCRIPTION OF THE DRAWINGS

The sole drawing FIGURE is a graph showing hardness and erosion rates for multiple samples of the crumb rubber coating having varying concentrations of crumb rubber and varying compositions of the crumb rubber.

DETAILED DESCRIPTION OF THE PREFERRED EMBODIMENTS

The recycled crumb rubber coating is a corrosion-proof coating for piping and the like. The coating is formed from recycled crumb rubber mixed with an epoxy resin and a hardener. Crumb rubber is first mixed with a liquid epoxy resin. The liquid epoxy resin is preferably a mixture of bisphenol A, bisphenol F and epichlorohydrin, such as D.E.R. 351, manufactured by Dow Chemical® of Midland, Mich. It should be understood that any suitable type of liquid epoxy resin may be utilized. The crumb rubber and liquid epoxy resin are mixed for about one minute.

An agent for reducing the viscosity of the liquid epoxy resin, such as benzyl alcohol, may also be added. A hardener is then added to this mixture. The hardener is preferably an aliphatic polyamine hardener, such as Aradur® 2973, manufactured by Huntsman Advanced Materials of Switzerland. It should be understood that any suitable type of hardener may be utilized. The hardener, crumb rubber and liquid epoxy resin (and the viscosity reducing agent, if used) are stirred together for about three minutes.

Finally, powdered crumb rubber is added and mixed for about five minutes at atmospheric temperature to form the recycled crumb rubber coating. The total crumb rubber forms about 23 wt % of the recycled crumb rubber coating. If no viscosity reducing agent is added, then the liquid epoxy resin forms about 51.6 wt % of the recycled crumb rubber coating. If the viscosity reducing agent is added, then the liquid epoxy resin forms about 50.1 wt % of the recycled crumb rubber coating, and the viscosity reducing agent forms about 1.5 wt % of the recycled crumb rubber coating. The hardener forms about 25.4 wt % of the recycled crumb rubber coating.

The coating may then be applied to an external surface of a pipe, structural element, or the like by dipping, pouring, spraying, or by any other suitable method of application. The coating is preferably applied and then left for about three hours of drying. The coating is flexible, resistant to cracking, and forms a relatively large film thickness in a single coat. The coating is re-coatable, provides corrosion resistance against water and chemicals, has excellent mechanical and abrasion resistance, and a lifetime of about ten years or longer.

The recycled crumb rubber coating is relatively dark, forming a dark grey or black surface, and may be further coated with a thin (on the order of about 30-50 microns) layer of acrylic or polyurethane paint for decorative purposes. Similarly, the thin layer of acrylic or polyurethane paint may be applied for protection against ultraviolet degradation.

Samples coated with the present recycled crumb rubber coating were tested in a highly corrosive environment using both immersion and potentio-dynamic testing. The coating showed excellent resistance to corrosion after exposure. The coating is also found to have excellent adhesion.

An alternative recycled crumb rubber coating composition may be made with a crumb rubber concentration varying between approximately 24 wt % and approximately 50 wt % of the coating. Table 1 below shows the compositions for three separate samples (Samples 1.1, 1.2 and 1.3), where the crumb rubber was in the form of 8 mesh crumb rubber ("Mesh CR") (the mesh size refers to the number of openings per linear square inch of a screen used to filter the particle size). The three samples have concentrations of Mesh CR of 24 wt %, 35 wt % and 50 wt %, respectively. Table 2 below shows the compositions for three separate samples (Samples 2.1, 2.2 and 2.3), where the crumb rubber was in the form of powdered crumb rubber ("Powder CR") having concentrations of Powder CR of 24 wt %, 35 wt % and 50 wt %, respectively. Table 3 below shows the compositions for three separate samples (Samples 3.1, 3.2 and 3.3), where the crumb rubber was in the form of 50 wt % mesh crumb rubber and 50 wt % powdered crumb rubber having concentrations of the crumb rubber mixture of 24 wt %, 35 wt % and 50 wt %, respectively. Table 4 below shows the compositions for three separate samples (Samples 4.1, 4.2 and 4.3), where the crumb rubber was in the form of 80 wt % mesh crumb rubber and 20 wt % powdered crumb rubber, having concentrations of the crumb rubber mixture of 24 wt %, 35 wt % and 50 wt %, respectively. Table 5 below shows the compositions for three separate samples (Samples 5.1, 5.2 and 5.3), where the crumb rubber was in the form of 20 wt % mesh crumb rubber and 80 wt % powdered crumb rubber, having concentrations of the crumb rubber mixture of 24 wt %, 35 wt % and 50 wt %, respectively.

TABLE 1

Recycled Crumb Rubber Coating Composition with Crumb Rubber Mesh

| Sample | Composition (wt %) | Actual Weights (g) |
|---|---|---|
| 1.1 | 24% Mesh CR<br>76% Resin + Hardener (2:1 Ratio)<br>1% Benzyl alcohol (of the Resin + Hardener) | 12 g Mesh CR<br>25.33 g Resin,<br>12.67 g Hardener<br>0.38 g Benzyl alcohol |
| 1.2 | 35% Mesh CR<br>65% Resin + hardener (2:1 Ratio)<br>1% Benzyl alcohol (of the Resin + Hardener) | 17.5 g Mesh CR<br>21.667 g Resin,<br>10.83 g Hardener<br>0.325 g Benzyl alcohol |
| 1.3 | 50% Mesh CR<br>50% Resin + hardener (2:1 Ratio)<br>1% Benzyl alcohol (of the Resin + Hardener) | 25 g Mesh CR<br>16.667 g Resin,<br>8.33 g Hardener<br>0.25 g Benzyl alcohol |

TABLE 2

Recycled Crumb Rubber Coating Composition with Powdered Crumb Rubber

| Sample | Composition (wt %) | Actual Weights (g) |
|---|---|---|
| 2.1 | 24% Powder CR<br>76% Resin + Hardener (2:1 Ratio)<br>2% Benzyl alcohol (of the Resin + Hardener) | 12 g Powder CR<br>25.33 g Resin,<br>12.67 g Hardener<br>0.76 g Benzyl alcohol |
| 2.2 | 35% Powder CR<br>65% Resin + Hardener (2:1 Ratio)<br>2% Benzyl alcohol (of the Resin + Hardener) | 17.5 g Powder CR<br>21.667 g Resin,<br>10.83 g Hardener<br>0.65 g Benzyl alcohol |
| 2.3 | 50% Powder CR<br>50% Resin + Hardener (2:1 Ratio)<br>2% Benzyl alcohol (of the Resin + Hardener) | 25 g Powder CR<br>16.667 g Resin,<br>8.33 g Hardener<br>0.50 g Benzyl alcohol |

TABLE 3

Recycled Crumb Rubber Coating Composition with Crumb Rubber Mixture

| Sample | Composition (wt %) | Actual Weights (g) |
|---|---|---|
| 3.1 | 24% (50% Powder CR + 50% Mesh CR)<br>76% Resin + Hardener (2:1 Ratio)<br>1% Benzyl alcohol (of the Resin + Hardener) | 6 g Powder CR,<br>6 g Mesh CR<br>25.33 g Resin,<br>12.67 g Hardener<br>0.38 g Benzyl alcohol |
| 3.2 | 35% (50% Powder CR + 50% Mesh CR)<br>65% Resin + Hardener (2:1 Ratio)<br>1% Benzyl alcohol (of the Resin + Hardener) | 8.75 g Powder CR,<br>8.75 g Mesh CR<br>21.667 g Resin,<br>10.83 g Hardener<br>0.325 g Benzyl alcohol |
| 3.3 | 50% (50% Powder CR + 50% Mesh CR)<br>50% Resin + Hardener (2:1 Ratio)<br>1% Benzyl alcohol (of the Resin + Hardener) | 12.5 g Powder CR,<br>12.5 g Mesh CR<br>16.667 g Resin,<br>8.33 g Hardener<br>0.25 g Benzyl alcohol |

TABLE 4

Recycled Crumb Rubber Coating Composition with Crumb Rubber Mixture

| Sample | Composition (wt %) | Actual Weights (g) |
|---|---|---|
| 4.1 | 24% (20% Powder CR + 80% Mesh CR)<br>76% Resin + Hardener (2:1 Ratio)<br>1% Benzyl alcohol (of the Resin + Hardener) | 2.4 g Powder CR,<br>9.6 g Mesh CR<br>25.33 g Resin,<br>12.67 g Hardener<br>0.38 g Benzyl alcohol |
| 4.2 | 35% (20% Powder CR + 80% Mesh CR)<br>65% Resin + Hardener (2:1 Ratio)<br>1% Benzyl alcohol (of the Resin + Hardener) | 3.5 g Powder CR,<br>14 g Mesh CR<br>21.667 g Resin,<br>10.83 g Hardener<br>0.325 g Benzyl alcohol |
| 4.3 | 50% (20% Powder CR + 80% Mesh CR)<br>50% Resin + Hardener (2:1 Ratio)<br>1% Benzyl alcohol (of the Resin + Hardener) | 5 g Powder CR,<br>20 g Mesh CR<br>16.667 g Resin,<br>8.33 g Hardener<br>0.25 g Benzyl alcohol |

TABLE 5

Recycled Crumb Rubber Coating Composition with Crumb Rubber Mixture

| Sample | Composition (wt %) | Actual Weights (g) |
|---|---|---|
| 5.1 | 24% (80% Powder CR + 20% Mesh CR)<br>76% Resin + Hardener (2:1 Ratio)<br>1% Benzyl alcohol (of the Resin + Hardener) | 9.6 g Powder CR,<br>2.4 g Mesh CR<br>25.33 g Resin,<br>12.67 g Hardener<br>0.38 g Benzyl alcohol |
| 5.2 | 35% (80% Powder CR + 20% Mesh CR)<br>65% Resin + Hardener (2:1 Ratio)<br>1% Benzyl alcohol (of the Resin + Hardener) | 14 g Powder CR,<br>3.5 g Mesh CR<br>21.667 g Resin,<br>10.83 g Hardener<br>0.325 g Benzyl alcohol |

TABLE 5-continued

Recycled Crumb Rubber Coating Composition
with Crumb Rubber Mixture

| Sample | Composition (wt %) | Actual Weights (g) |
|---|---|---|
| 5.3 | 50% (80% Powder CR + 20% Mesh CR)<br>50% Resin + Hardener (2:1 Ratio)<br>1% Benzyl alcohol (of the Resin + Hardener) | 20 g Powder CR,<br>5 g Mesh CR<br>16.667 g Resin,<br>8.33 g Hardener<br>0.25 g Benzyl alcohol |

The optimal sample would have the highest hardness and lowest erosion rate. Hardness tests were conducted using the Brinell hardness scale with an indenter having a diameter of 5 mm, and an applied load of 25 kg. Erosion testing was conducted using alumina impingement, and the erosion rate was calculated based on the mass of the coating removed (in mg) per the mass of erodent (in g), with a particles feed rate of 2.5 g/min at a temperature of 90° C. The sole drawing Figure shows the results of the hardness and erosion testing for each of the samples described above. As can be seen, Sample 4.1 (24 wt % of crumb rubber with a crumb rubber mixture of 20% Powder CR+80% Mesh CR) has the greatest difference between hardness and erosion rate. If one considers erosion rate alone, then Sample 4.3 (50 wt % of crumb rubber with a crumb rubber mixture of 20% Powder CR+80% Mesh CR) has a relatively high erosion rate, due to this sample having the lowest hardness value. If one considers hardness alone, then Sample 3.1 (24 wt % of crumb rubber with a crumb rubber mixture of 50% Powder CR+50% Mesh CR) has the highest hardness value. The optimal choice of pipe coating depends upon the particular application and environment in which the pipe will be used, e.g., whether corrosion or erosion of the coating is the primary concern (sample 4.3 might be the best choice, even though it has the lowest hardness), whether hardness (e.g., for underground applications) is the primary concern (sample 3.1 might be the best choice, having the highest hardness), or whether a balance between hardness and corrosion resistance can be tolerated.

For purposes of the present patent application, the term "mesh crumb rubber" is defined as a coarse particulate crumb rubber having a particle size generally in the millimeter-size range, i.e., having at least one dimension greater than or equal to 1 mm. For example, SEM micrographs showed that the "Mesh Crumb Rubber" used in the examples of Tables 1-5 had a particle size of 2-3 mm. The terms "powder crumb rubber" and "crumb rubber powder" are defined as a fine particulate crumb rubber having a particle size in the micron range, i.e., less than 1 mm in every dimension. For example, the "Powder Crumb Rubber" used in the examples of Tables 1-5 had a particle size of 100-200 microns.

It is to be understood that the present invention is not limited to the embodiments described above, but encompasses any and all embodiments within the scope of the following claims.

We claim:

1. A recycled crumb rubber coating composition, comprising a mixture of:
   about 24.0 wt % of a crumb rubber blend having about 20 wt % powdered crumb rubber and about 80 wt % mesh crumb rubber; and
   the balance being epoxy having a liquid epoxy resin: epoxy hardener ratio of about 2:1 by weight.

2. The recycled crumb rubber coating composition as recited in claim 1, wherein said liquid epoxy resin comprises a reaction mixture of bisphenol A, bisphenol F and epichlorohydrin.

3. The recycled crumb rubber coating composition as recited in claim 2, wherein said hardener comprises an aliphatic polyamine hardener.

4. The recycled crumb rubber coating composition as recited in claim 1, wherein said hardener comprises an aliphatic polyamine hardener.

5. The recycled crumb rubber coating composition as recited in claim 4, wherein said liquid epoxy resin comprises a reaction mixture of bisphenol A, bisphenol F and epichlorohydrin.

6. The recycled crumb rubber coating composition according to claim 1, wherein said epoxy further comprises a viscosity reducing agent.

7. The recycled crumb rubber coating composition according to claim 6, wherein said viscosity reducing agent comprises about 1% by weight of the total weight of said liquid epoxy resin and said epoxy hardener.

8. The recycled crumb rubber coating composition as recited in claim 6, wherein said epoxy viscosity reducing agent comprises benzyl alcohol.

9. The recycled crumb rubber coating composition as recited in claim 8, wherein said hardener comprises an aliphatic polyamine hardener.

10. The recycled crumb rubber coating composition as recited in claim 9, wherein said liquid epoxy resin comprises a reaction mixture of bisphenol A, bisphenol F and epichlorohydrin.

11. A recycled crumb rubber coating composition, comprising a mixture of:
    between about 24 wt % and about 50 wt % of a crumb rubber blend having a mixture of powdered crumb rubber and mesh crumb rubber; and
    the balance being epoxy having a liquid epoxy resin: epoxy hardener ratio of about 2:1 by weight.

12. The recycled crumb rubber coating composition as recited in claim 11, wherein said liquid epoxy resin comprises a reaction mixture of bisphenol A, bisphenol F and epichlorohydrin.

13. The recycled crumb rubber coating composition as recited in claim 12, wherein said hardener comprises an aliphatic polyamine hardener.

14. The recycled crumb rubber coating composition as recited in claim 11, wherein said hardener comprises an aliphatic polyamine hardener.

15. The recycled crumb rubber coating composition as recited in claim 14, wherein said liquid epoxy resin comprises a reaction mixture of bisphenol A, bisphenol F and epichlorohydrin.

16. The recycled crumb rubber coating composition according to claim 11, wherein said epoxy further comprises a viscosity reducing agent.

17. The recycled crumb rubber coating composition according to claim 16, wherein said viscosity reducing agent comprises about 1% by weight of the total weight of said liquid epoxy resin and said epoxy hardener.

18. The recycled crumb rubber coating composition as recited in claim 16, wherein said epoxy viscosity reducing agent comprises benzyl alcohol.

19. The recycled crumb rubber coating composition according to claim 11, wherein said crumb rubber blend consists of between 20% and 80% powdered crumb rubber, the balance being mesh crumb rubber.

* * * * *